(12) United States Patent
Yamagishi

(10) Patent No.: US 10,165,035 B2
(45) Date of Patent: Dec. 25, 2018

(54) CONTENT SUPPLYING DEVICE, CONTENT SUPPLYING METHOD, PROGRAM, AND CONTENT SUPPLYING SYSTEM

(71) Applicant: SATURN LICENSING LLC, New York, NY (US)

(72) Inventor: Yasuaki Yamagishi, Kanagawa (JP)

(73) Assignee: Saturn Licensing LLC, New York, NY (US)

(*) Notice: Subject to any disclaimer, the term of this patent is extended or adjusted under 35 U.S.C. 154(b) by 339 days.

(21) Appl. No.: 14/764,644

(22) PCT Filed: Mar. 7, 2014

(86) PCT No.: PCT/JP2014/055928
§ 371 (c)(1),
(2) Date: Jul. 30, 2015

(87) PCT Pub. No.: WO2014/148277
PCT Pub. Date: Sep. 25, 2014

(65) Prior Publication Data
US 2015/0365458 A1    Dec. 17, 2015

(30) Foreign Application Priority Data

Mar. 19, 2013  (JP) .................................. 2013-056759

(51) Int. Cl.
*G06F 15/16*  (2006.01)
*H04L 29/06*  (2006.01)
(Continued)

(52) U.S. Cl.
CPC ........ *H04L 65/608* (2013.01); *H04L 12/1827* (2013.01); *H04L 29/0809* (2013.01);
(Continued)

(58) Field of Classification Search
USPC .......... 709/219, 231, 202; 386/241; 348/159
See application file for complete search history.

(56) References Cited

U.S. PATENT DOCUMENTS

2011/0191404 A1* 8/2011 Kako .................... H04L 12/185
709/202
2012/0259994 A1* 10/2012 Gillies ................ H04L 12/1881
709/231
(Continued)

FOREIGN PATENT DOCUMENTS

EP          2 445 162 A1    4/2012
WO    WO 2010/050022 A1    5/2010
(Continued)

OTHER PUBLICATIONS

International Search Report dated Jun. 17, 2014 in PCT/JP2014/055928.
(Continued)

*Primary Examiner* — Tammy Nguyen
(74) *Attorney, Agent, or Firm* — Oblon, McClelland, Maier & Neustadt, L.L.P.

(57) ABSTRACT

There is provided a content supplying device that supplies streaming data of content in accordance with MPEG-DASH, the content supplying device including: an HTTP transmission unit configured to convert each segment of the streaming data into a file and to unicast the resulting segment files via HTTP; an RTP transmission unit configured to multicast and/or broadcast the segment files via RTP; and a metafile generation unit configured to generate a metafile describing a chronological correspondence relation between the segment files to be unicasted via HTTP and the segment files to be multicasted and/or broadcasted via RTP, and to supply the metafile to a receiver.

17 Claims, 16 Drawing Sheets

(51) Int. Cl.

| | | |
|---|---|---|
| *H04N 21/266* | (2011.01) | |
| *H04N 21/43* | (2011.01) | |
| *H04N 21/44* | (2011.01) | |
| *H04N 21/63* | (2011.01) | |
| *H04N 21/64* | (2011.01) | |
| *H04N 21/845* | (2011.01) | |
| *H04L 12/18* | (2006.01) | |
| *H04L 29/08* | (2006.01) | |

(52) U.S. Cl.
CPC ........ *H04L 65/4084* (2013.01); *H04L 65/602* (2013.01); *H04L 65/80* (2013.01); *H04L 69/08* (2013.01); *H04N 21/26616* (2013.01); *H04N 21/4307* (2013.01); *H04N 21/44016* (2013.01); *H04N 21/631* (2013.01); *H04N 21/64* (2013.01); *H04N 21/8456* (2013.01); *H04L 67/02* (2013.01)

(56) References Cited

U.S. PATENT DOCUMENTS

| | | | |
|---|---|---|---|
| 2013/0294747 A1* | 11/2013 | Takahashi | H04N 21/2187 386/241 |
| 2014/0232874 A1* | 8/2014 | Meyer | H04N 7/181 348/159 |

FOREIGN PATENT DOCUMENTS

| | | |
|---|---|---|
| WO | WO 2012/096372 A1 | 7/2012 |
| WO | WO 2012/138909 A1 | 10/2012 |

OTHER PUBLICATIONS

H. Schulzrinne, et al. "RTP: A Transport Protocol for Real-Time Applications" RFC 3550, Network Working Group, Standards Track, Jul. 2003, pp. 29-34 and Cover Pages.

"Guidelines for Progressive Download Using the Adaptive Streaming Profile" S4-100452, 3GPP TSG-SA4 Meeting #59, Research in Motion UK Limited, Jun. 2010, pp. 1-4 and Cover Pages.

International Preliminary Report on Patentability dated Jun. 17, 2014 in PCT/JP2014/055928 (with English language translation).

Extended European Search Report dated Sep. 26, 2016 in Patent Application No. 14767964.1.

Mitsuhiro Hirabayashi, "Realizing Moving Image Delivery With No Drop-outs in an Existing Web Server," Nikkei Electronics, 2012, pp. 77-85.

Yasuaki Tokumo, et al. "Response to CfPs on MPEG Media Transport (MMT)", Sharp Corporation, Japan, Motion Picture Expert Group or ISO/IEC JTC1/SC29/WG11, No. M19194, XP030047761, 2011, 8 Pages.

Takuya Iwanami, et al. "DASH: multicast/broadcast extension to DASH", Sharp Corporation, Japan, ISO/IEC, JCT 1/SC 29/WG 11, No. M24800, XP030053143, 2012, pp. 1-3.

Information technology—Dynamic adaptive streaming over HTTP (DASH)—ISO/IEC International Standard, XP002697029, 2012, 134 Pages.

H. Schulzrinne, et al. "Real Time Streaming Protocol 2.0 (RTSP) draft-ietf-mmusic-rfc2326bis-31," Music Working Group, ISOC, XP015092292, 2013, pp. 1-301.

Harald Fuchs, et al. "Optimizing channel change time in IPTV applications" IEEE , Broadband Multimedia Systems and Broadcasting, XP031268571, 2008, pp. 1-8.

\* cited by examiner

FIG. 8

```
<MPD ......>
<Period ......>
<AdaptationSet>
<Representation ......>
......
<BaseURL>http://example.com/counter-10mn_avc_dash.mp4</BaseURL>
<SegmentList ......>
......
<SegmentURL mediaRange="795-83596"/>
<SegmentURL mediaRange="83597-166046"/>
<SegmentURL mediaRange="166047-248857"/>
<SegmentURL mediaRange="248858-331477"/>
......
</MPD>
```

FIG. 9

```
<MPD ..., >
<Period ..., >
<AdaptationSet>
<Representation ..., >
<BaseURL serviceLocationAttributeUrl=" http://example.com/serviceLocationAttributes"
>(DESCRIPTION HEREIN IS IGNORED)</BaseURL>
<SegmentList ..., >
  ......
  <SegmentURL mediaRange="795-83596" rtspRange=" clock=19961108T143720.25Z-19961108T143730.25Z" />
  <SegmentURL mediaRange="83597-166046" rtspRange=" clock=19961108T143730.25Z-19961108T143740.25Z" />
  ......
</MPD>
```

FIG. 10

```
<xs:schema xmlns:xs="http://www.w3.org/2001/XMLSchema"
elementFormDefault="qualified" attributeFormDefault="unqualified">
<xs:element name="ServiceLocation" type="ServiceLocationType"/>
<xs:complexType name="ServiceLocationType">
<xs:sequence>
<xs:element name="IPMulticastAddress" type="xs:anyURI" maxOccurs="unbounded"/>
<xs:element name="DeliverySystem" type="DeliverySystemAttributesType" minOccurs="0" maxOccurs="unbounded"/>
</xs:sequence>
</xs:complexType>
<xs:complexType name="DeliverySystemAttributesType">
<xs:sequence>
<xs:element name="DeliverySystemIdentifier" type="xs:string" maxOccurs="unbounded"/>
<xs:element name="DeliverySystemDescriptor" type="xs:string" maxOccurs="unbounded"/>
</xs:sequence>
</xs:complexType>
</xs:schema>
```

FIG. 12

```
<bundleDescription
xmlns="urn:3GPP:metadata:2005:MBMS:userServiceDescription"
xmlns:xsi="http://www.w3.org/2001/XMLSchema-instance"
xmlns:r8="urn:3GPP:metadata:2008:MBMS:userServiceDescription">
<userServiceDescription serviceId="urn:123">
<deliveryMethod sessionDescriptionURI="http://www.example.com/a.sdp"/>
<r8:Registration>
<r8:registrationURL>http://www.example.com/register.php</r8:registrationURL>
</r8:Registration>
</userServiceDescription>
</bundleDescription>
```

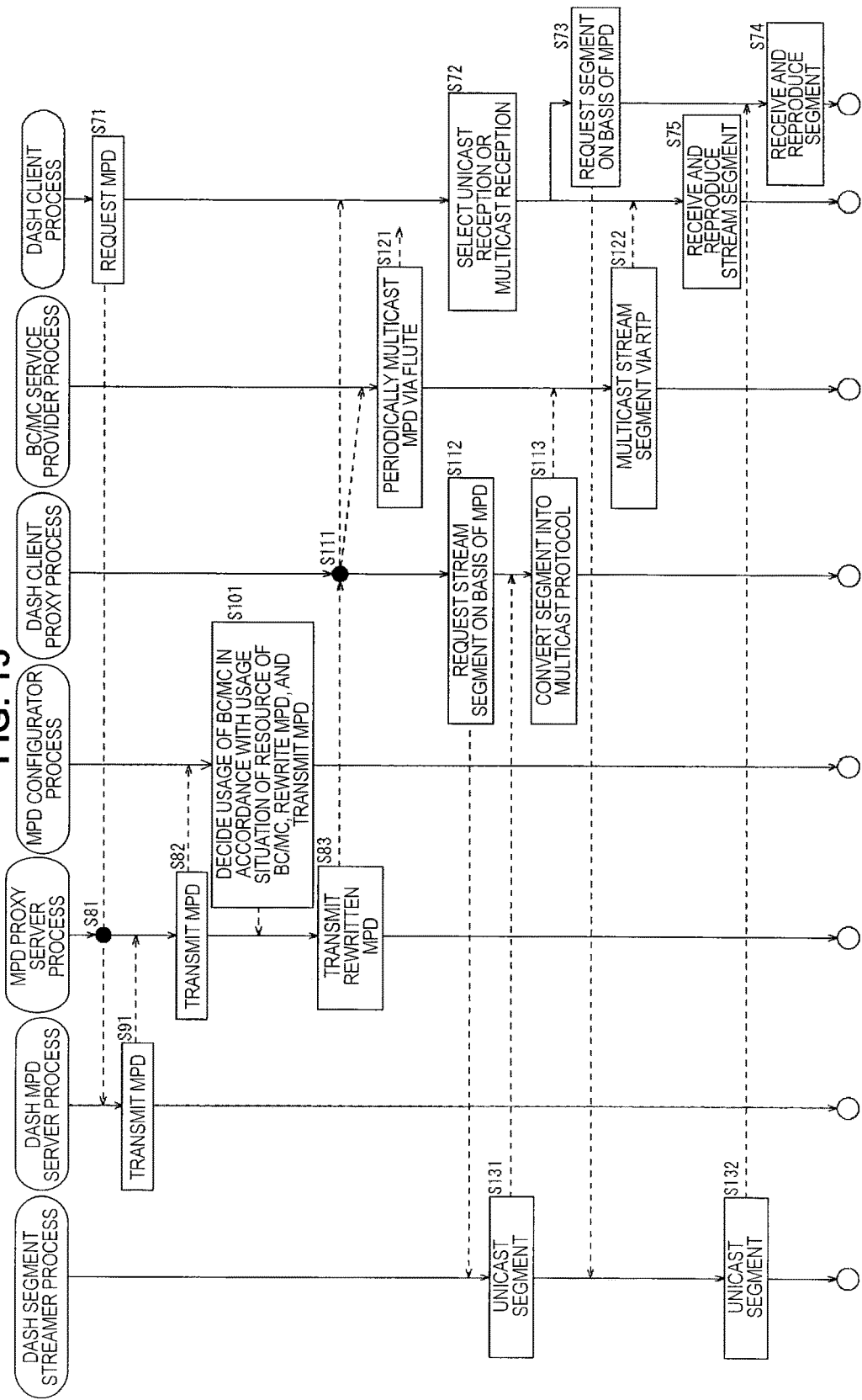

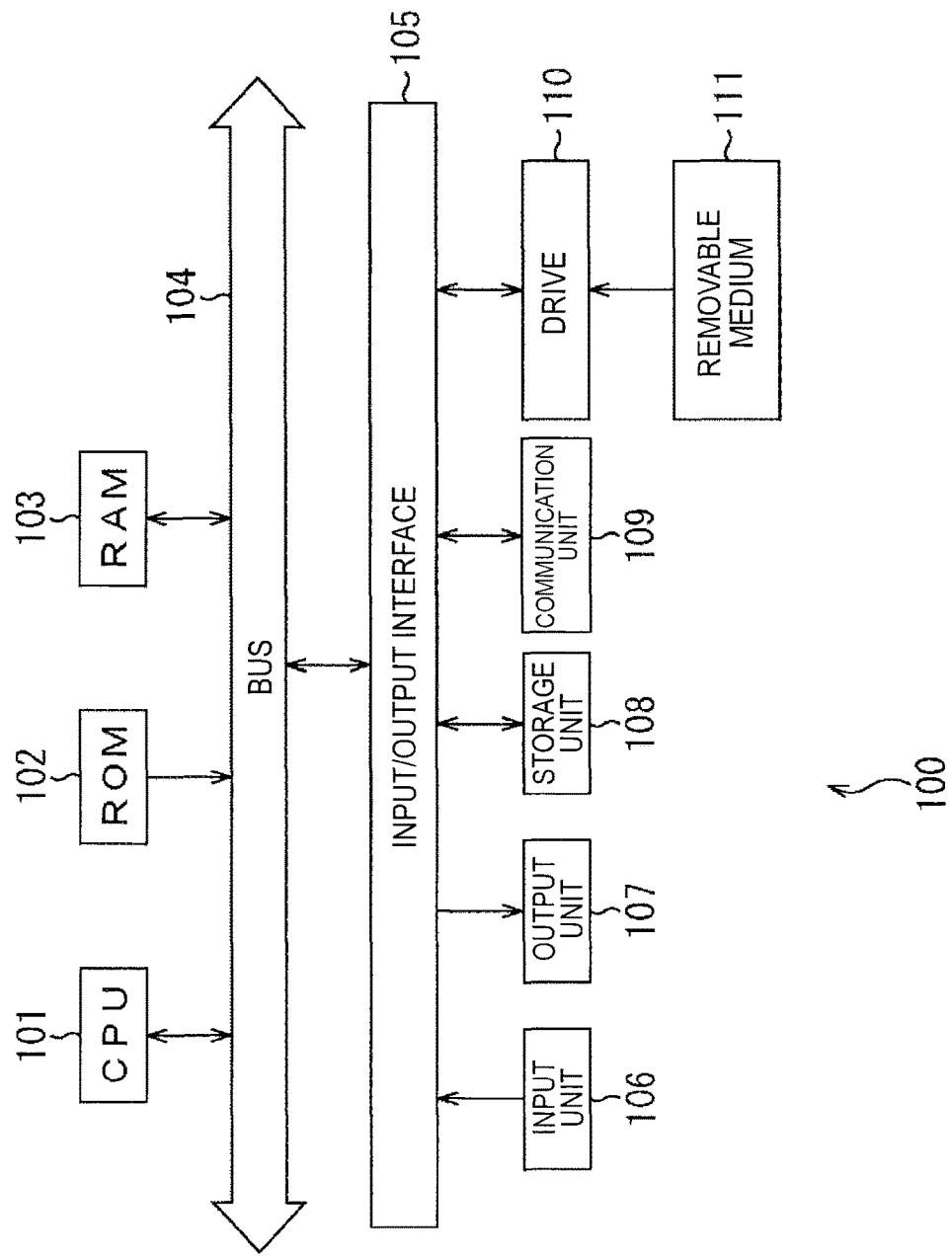

CONTENT SUPPLYING DEVICE, CONTENT SUPPLYING METHOD, PROGRAM, AND CONTENT SUPPLYING SYSTEM

TECHNICAL FIELD

The present disclosure relates to content supplying devices, content supplying methods, programs, and content supplying systems. In particular, the present disclosure relates to a content supplying device, content supplying method, program, and content supplying program capable of multicasting or broadcasting content through a network via Real-time Transport Protocol (RTP) as a path alternative to a case of unicasting the content through the Internet via Hypertext Transfer Protocol (HTTP).

BACKGROUND ART

Recently, over-the-top video (OTT-V) has entered the mainstream of streaming services using the Internet. As a basic technology of OTT-V, Moving Picture Experts Group-Dynamic Adaptive Streaming over HTTP (MPRG-DASH, hereinafter, referred to as DASH) using HTTP through which a supplier and a receiver are connected by point to point in a way similar to a case of browsing a Website (for example, see Non-Patent Literature 1) is known.

According to DASH, adaptive streaming technologies have been achieved. That is, a supplier of content is capable of preparing a plurality of streams of content having identical contents whose image qualities and angle-of-view size are different, and a receiver is capable of switching and viewing an optimal stream according to Internet communication environment and receiver's performance and status.

In DASH, the supplier supplies a metafile called media presentation description (MPD) to the receiver, as information for causing the receiver to adaptively switch streams. In the MPD, an address (URL information) of a source of chunked streaming data (media data such as audio, video, and subtitles) is described. On the basis of the URL information, the receiver accesses a predetermined server, acquires streaming data transmitted via HTTP, and reproduces the streaming data.

FIG. 1 shows a configuration example of a content supplying system for delivering content as a stream on the basis of DASH.

The content supplying system 20 includes a content management server 21, DASH segment streamer 22, and DASH MPD server 23 that are at a content supplier side, and a DASH client 30 at a content viewer side. Note that, though not shown, there are a plurality of the DASH clients 30.

The content management server 21 manages content to be supplied to the receiver, generates pieces of streaming data having different bit rates from content having identical contents, and outputs the generated pieces of streaming data to the DASH segment streamer 22.

The DASH segment streamer 22 divides the streaming data of the content into segments chronologically, converts each segment into a file, retains the files, and notifies addresses of the files to the DASH MPD server 23. In addition, as an HTTP server, the DASH segment streamer 22 transmits the files of the segmented streaming data to the DASH client 30 at the receiver side via the Internet 11 in response to a request from the DASH client 30.

The DASH MPD server 23 generates an MPD describing addresses of sources of the files of the segmented streaming data. In addition, as an HTTP server, the DASH MPD server 23 transmits the MPD to the DASH client 30 at the receiver side via the Internet 11 in response to a request from the DASH client 30.

The DASH client 30 at the receiver side acquires and reproduces the content. Specifically, the DASH client 30 accesses the DASH segment streamer 22 on the basis of the MPD acquired from the DASH MPD server 23, and acquires and reproduces the files of the segmented streaming data.

Note that, it is also possible to provide a cache server on the Internet 11, cache the files of the segmented streaming data and the MPD to be transmitted via HTTP etc., and substitute operations of the DASH segment streamer 22 and the DASH MPD server 23.

CITATION LIST

Non-Patent Literature

Non-Patent Literature 1: "Realize the video delivery uninterrupted in existing Web servers", Mitsuhiro HIRABAYASHI, NIKKEI ELECTRONICS 2012 Mar. 19

SUMMARY OF INVENTION

Technical Problem

As described above, according to the DASH, the adaptive streaming technology for supplying content through unicast transmission via HTTP is achieved.

However, in a case in which content such as real time broadcasting of sports that may be acquired and reproduced by many DASH clients 30 at the same time is supplied via DASH, support from a content delivery network (CDN) is necessary because HTTP is used. However, even when the support from the CDN is available, it is difficult to achieve scalability comparable to existing broadcast delivery because of cost limitation.

Meanwhile, a method using a multicast bearer and/or a broadcast bearer via a television network and/or a mobile network is used for supplying content to many receivers at the same time. In general, the RTP is used for this method.

Accordingly, when the receiver of the content is compatible with multicast transmission and broadcast transmission, it is preferable that the multicast transmission and/or the broadcast transmission are used as alternative paths in DASH and the receiver is allowed to adaptively select a stream.

However, according to the existing DASH specification, it is only assumed to transmit streaming data of content via HTTP, and it is not assumed to use the multicast bearer and the broadcast bearer. Therefore, an MPD of DASH does not describe a correspondence relation between a DASH segment to be unicasted via HTTP and a content section to be streamed via RTP on a broadcast bearer or multicast bearer corresponding to the segment section. Accordingly, it is difficult to achieve seamless switching between unicast transmission and multicast transmission or broadcast transmission of content.

In a nod to the above described issues, the present disclosure achieves the seamless switching between the unicast transmission of content via HTTP and multicast transmission or broadcast transmission of the content via RTP.

Solution to Problem

According to a first aspect of the present disclosure, there is provided a content supplying device that supplies streaming data of content in accordance with MPEG-DASH, the content supplying device including: an HTTP transmission unit configured to convert each segment of the streaming data into a file and to unicast the resulting segment files via HTTP; an RTP transmission unit configured to multicast and/or broadcast the segment files via RTP; and a metafile generation unit configured to generate a metafile describing a chronological correspondence relation between the segment files to be unicasted via HTTP and the segment files to be multicasted and/or broadcasted via RTP, and to supply the metafile to a receiver.

The content supplying device according to the first aspect of the present disclosure may further includes an MPD generation unit configured to generate an MPD describing information for receiving the segment files to be unicasted via HTTP. The metafile generation unit may generate the metafile by rewriting the MPD.

The metafile generation unit may generate the metafile by adding rtspRange attributes of the segment files to be multicasted and/or broadcasted via RTP in association with mediaRange attributes of the segment files to be unicasted via HTTP, the mediaRange attributes being described in the MPD.

The RTP transmission unit may perform protocol conversion for migrating, to RTP packets, the segment files unicasted by the HTTP transmission unit via HTTP, and multicast and/or broadcast the segment files.

The RTP transmission unit may further transmit an RTP timestamp and an NTP timestamp corresponding to the RTP timestamp via RTCP.

According to the first aspect of the present disclosure, there is provided a content supplying method performed by a content supplying device that supplies streaming data of content in accordance with MPEG-DASH, the content supplying method including: an HTTP transmission step of converting each segment of the streaming data into a file and unicasting the resulting segment files via HTTP; an RTP transmission step of multicasting and/or broadcasting the segment files via RTP; and a metafile generation step of generating a metafile describing a chronological correspondence relation between the segment files to be unicasted via HTTP and the segment files to be multicasted and/or broadcasted via RTP, and supplying the metafile to a receiver.

According to the first aspect of the present disclosure, there is provided a program causing a computer that supplies streaming data of content in accordance with MPEG-DASH to function as: an HTTP transmission unit configured to convert each segment of the streaming data into a file and to unicast the resulting segment files via HTTP; an RTP transmission unit configured to multicast and/or broadcast the segment files via RTP; and a metafile generation unit configured to generate a metafile describing a chronological correspondence relation between the segment files to be unicasted via HTTP and the segment files to be multicasted and/or broadcasted via RTP, and to supply the metafile to a receiver.

According to the first aspect of the present disclosure, each segment of streaming data is converted into a file, the resulting segment files are unicasted via HTTP, and the segment files are multicasted and/or broadcasted via RTP. In addition, a metafile describing a chronological correspondence relation between the segment files to be unicasted via HTTP and the segment files to be multicasted and/or broadcasted via RTP is generated and supplied to a receiver.

According to a second aspect of the present disclosure, there is provided a content supplying system including: a content supplying device that supplies streaming data of content in accordance with MPEG-DASH; and a client device that receives the stream data. The content supplying device including an HTTP transmission unit configured to convert each segment of the streaming data into a file and to unicast the resulting segment files via HTTP, an RTP transmission unit configured to multicast and/or broadcast the segment files via RTP, and a metafile generation unit configured to generate a metafile describing a chronological correspondence relation between the segment files to be unicasted via HTTP and the segment files to be multicasted and/or broadcasted via RTP, and to supply the metafile to a receiver. On the basis of the acquired metafile, the client device switches the segment files to be unicasted via HTTP and the segment files to be multicasted and/or broadcasted via RTP so as to receive and reproduce the segment files.

According to the second aspect of the present disclosure, the content supplying device converts each segment of streaming data into a file, unicasts the resulting segment files via HTTP, and multicasts and/or broadcasts the segment files via RTP. In addition, a metafile describing a chronological correspondence relation between the segment files to be unicasted via HTTP and the segment files to be multicasted and/or broadcasted via RTP is generated and supplied to a receiver. On the basis of the acquired metafile, the client device switches the segment files to be unicasted via HTTP and the segment files to be multicasted and/or broadcasted via RTP so as to receive and reproduce the segment files.

Advantageous Effects of Invention

According to the first and second aspects of the present disclosure, it is possible to achieve the seamless switching between the unicast transmission of content via HTTP and multicast transmission or broadcast transmission of the content via RTP.

BRIEF DESCRIPTION OF DRAWINGS

FIG. 8 is a diagram showing an example of an MPD.

FIG. 9 is a diagram showing an example of a rewritten MPD.

FIG. 10 is a diagram showing an example of XML Schema of a ServiceLocation element.

FIG. 12 is a diagram showing an example of User Service Description.

FIG. 15 is a flowchart showing a second operation of a content supplying system.

FIG. 16 is a block diagram showing a configuration example of a computer.

DESCRIPTION OF EMBODIMENTS

The following is a detailed description of best modes for carrying out the present disclosure (hereinafter referred to as embodiments), with reference to the drawings.

[Configuration Example of Content Supplying System]

A content supplying system according to an embodiment of the present disclosure is capable of the seamless switching between content streams of the unicast transmission via HTTP and content streams of multicast transmission and broadcast transmission via RTP when a receiver acquires and reproduces content.

Specifically, a MPD in DASH is extended so as to describe a correspondence relation between mediaRange indicating a section of a content stream to be unicasted via HTTP and rstpRange indicating a section of a content stream to be multicasted or broadcasted via RTP.

Figure 1:
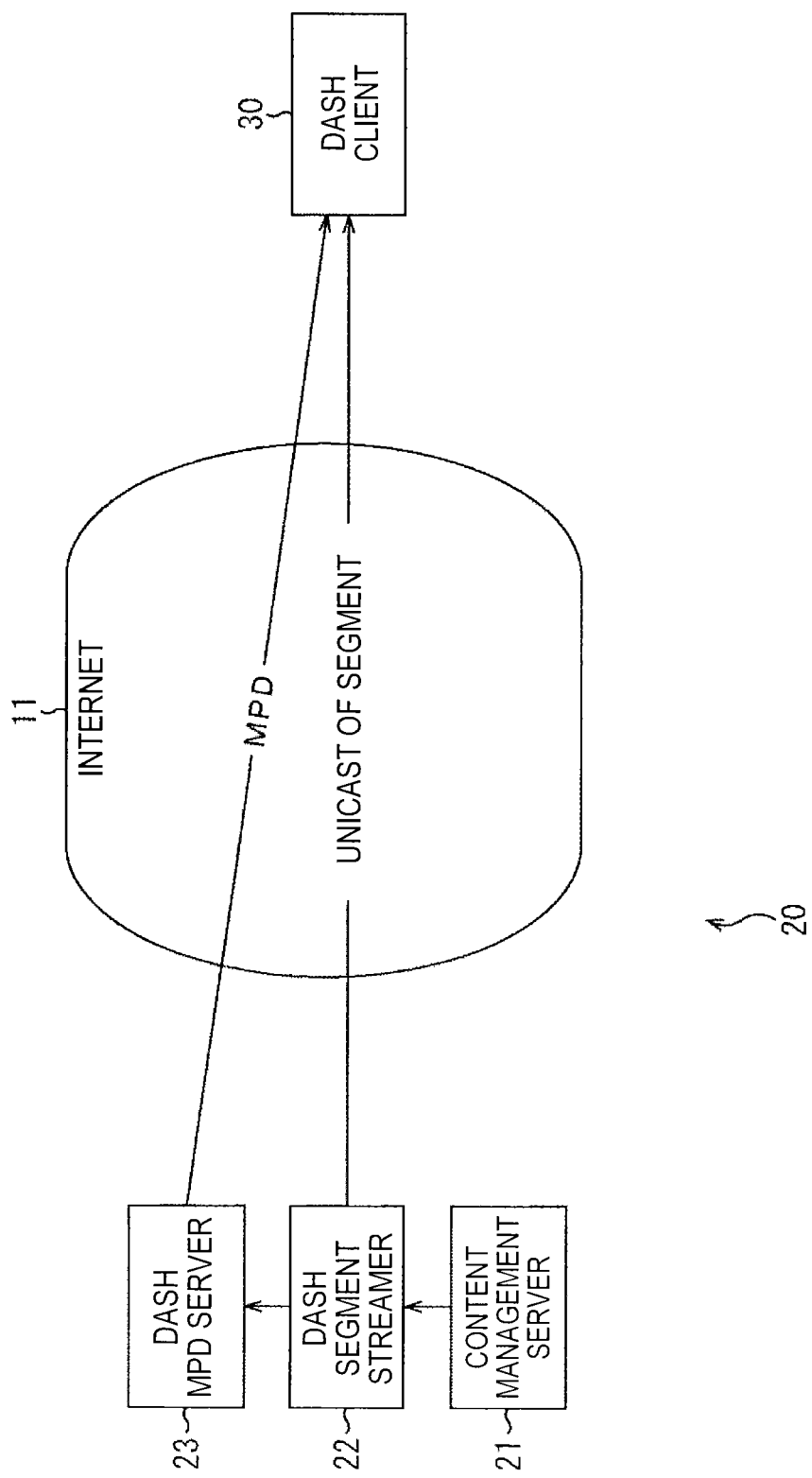
FIG. 1 is a block diagram showing a configuration example of an existing content supplying system using DASH.
Figure 2:
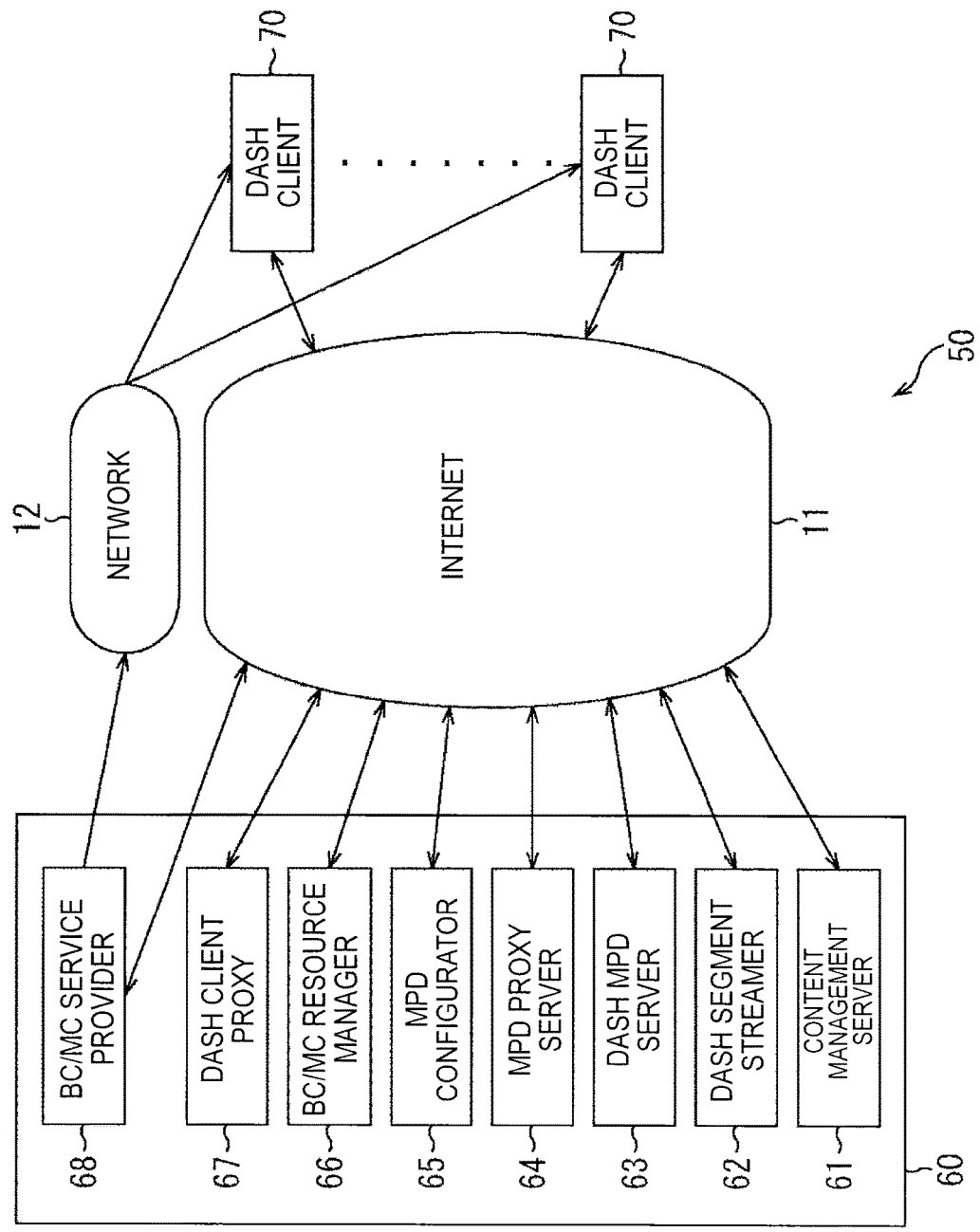
FIG. 2 is a block diagram showing a configuration example of the content supplying system according to the present disclosure.

FIG. 2 shows a configuration example of the content supplying system according to an embodiment of the present disclosure.

The content supplying system 50 includes a content supplying device 60 at a content supplier side and many DASH clients 70 at a content viewer side. The content supplying device 60 and the DASH clients 70 are connected via the Internet 11. The DASH client 70 is capable of receiving content multicasted and broadcasted by the content supplying device 60 through a network 12. The network 12 includes a mobile network such as Multimedia Broadcast Multicast Services (MBMS) in addition to the television network using ground waves, satellite waves, or the like.

The content supplying device 60 includes a content management server 61, a DASH segment streamer 62, a DASH MPD server 63, an MPD proxy server 64, an MPD configurator 65, a broadcast/multicast (BC/MC) resource manager 66, a DASH client proxy 67, and a broadcast/multicast (BC/MC) service provider 68 that are mutually connected through the Internet 11.

The content management server 61 manages content (including live broadcasting content) to be supplied to the DASH client 70 at the receiver side, generates pieces of streaming data having different bit rates from content having identical contents, and supplies the generated pieces of streaming data to the DASH segment streamer 62.

The DASH segment streamer 62 divides the streaming data of the content chronologically.

Figure 3:
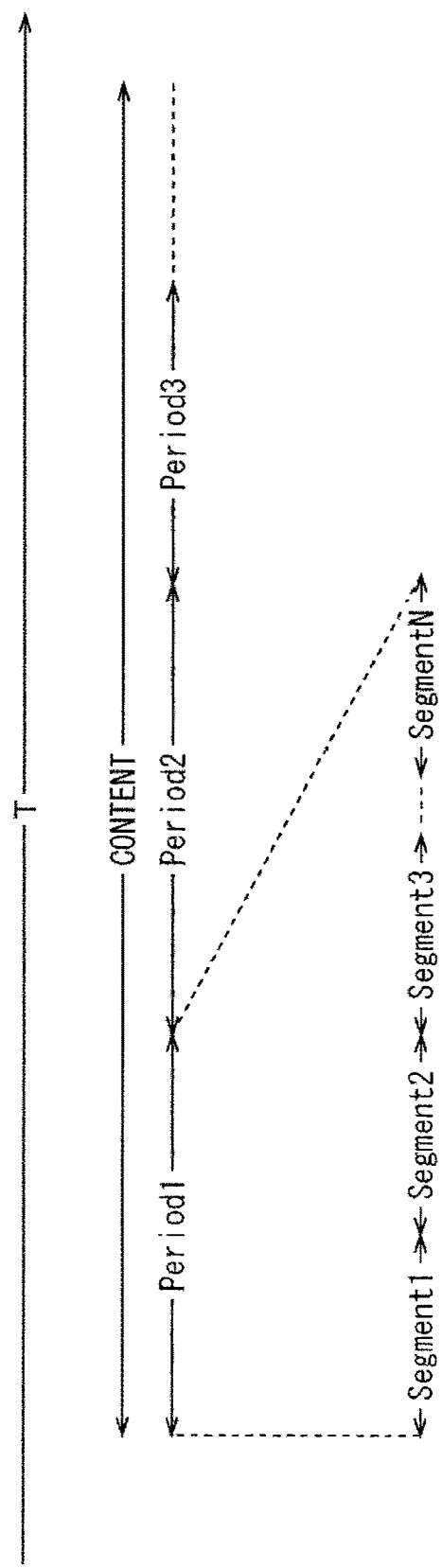
FIG. 3 is a diagram illustrating chronological separation of content.

FIG. 3 shows chronological separation of content. That is, as shown in FIG. 3, the DASH segment streamer 62 separates the streaming data of the content into periods chronologically, divides the periods into segments, converts each segment into a file, and notifies addresses of sources of the files to the DASH MPD server 63.

In addition, as an HTTP server, the DASH segment streamer 62 transmits the files of the segmented streaming data via HTTP through the Internet 11 (unicasts the files of the segmented streaming data by using HTTP) in response to a request from the DASH client 70.

The DASH MPD server 63 generates an MPD to be referred to by the DASH client 70 that acquires the content unicasted via HTTP. Subsequently, in response to the request from the DASH client 70, the DASH MPD server 63 transmits the MPD via HTTP through the Internet 11. In addition, the DASH MPD server 63 supplies the generated MPD in response to the request from the MPD proxy server 64.

The MPD proxy server 64 acquires the MPD from the DASH MPD server 63, and supplies the MPD to the MPD configurator 65.

The MPD configurator 65 rewrites the MPD so that the DASH client 70 can acquire content to broadcasted and multicasted, the content having contents identical with that of content to be unicasted via HTTP. The broadcast/multicast resource manager 66 notifies states of resource of the broadcast bearer and the multicast bearer to the MPD configurator 65.

The DASH client proxy 67 transmits the rewritten MPD to the DASH client 70 and supplies the rewritten MPD to the broadcast/multicast service provider 68 so as to cause the rewritten MPD to be multicasted via FLUTE. The DASH client proxy 67 acquires the segments of the content from the DASH segment streamer 62, converts the acquired segments into multicast protocols or broadcast protocols, supplies the segments to the broadcast/multicast service provider 68, and causes the segments to be multicasted and broadcasted via RTP through the network 12.

The broadcast/multicast service provider 68 multicasts the rewritten MPD via FLUTE through the network 12. In addition, the broadcast/multicast service provider 68 multicasts and broadcasts the stream segments of the content via RTP through the network 12.

[Overview of MPD]

Figure 4:
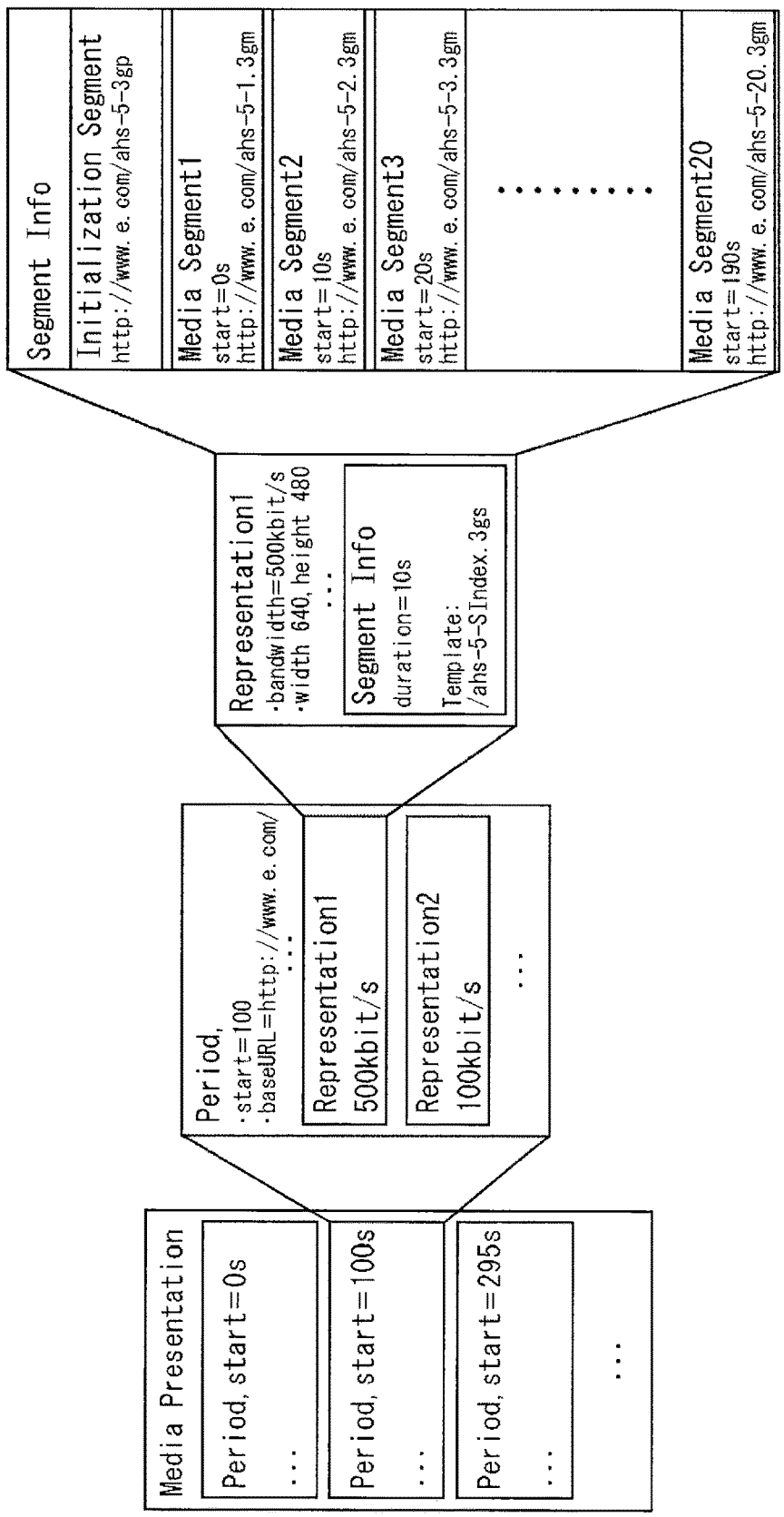
FIG. 4 is a diagram showing a configuration of an MPD.
Figure 5:
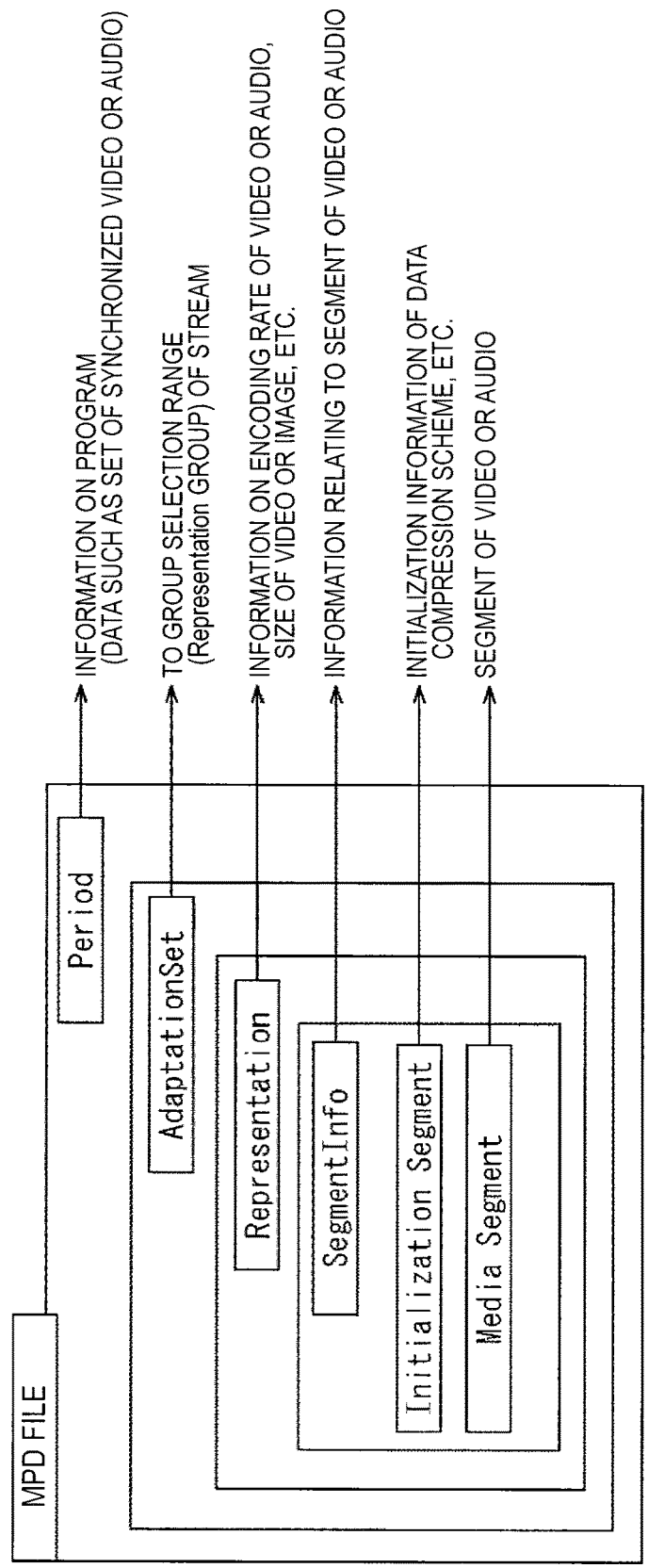
FIG. 5 is a diagram showing hierarchy lower than Period in an MPD.

Next, with reference to FIGS. 4 and 5, an overview of the MPD in DASH is explained.

FIG. 4 shows a data configuration of the MPD. FIG. 5 shows hierarchy lower than Period in the MPD.

In the MPD, information on the content (Media) is sectioned into Periods. In each of the Periods, a plurality of Representation including information on steaming data having an identical content and having a different stream attribute such as the bit rate are prepared. The Representation stores information on Segments obtained by further segmentalizing the Period chronologically.

Figure 6:
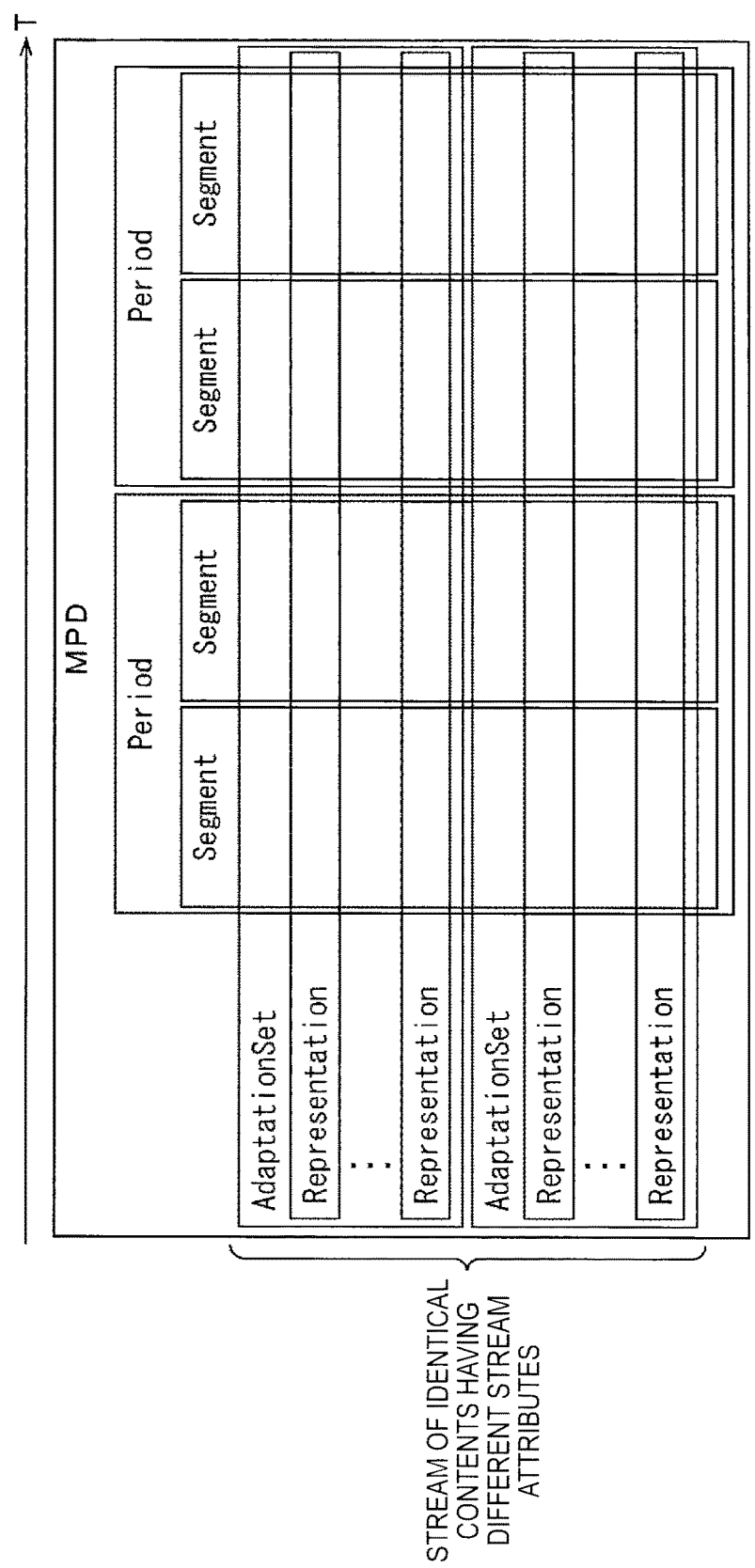
FIG. 6 is a diagram in which elements of an MPD are arranged on a time axis.

FIG. 6 is a diagram in which elements of the MPD are arranged on a time axis.

As shown in FIG. 6, there are a plurality of Representations for a Segment. Accordingly, the DASH client 70 adaptively selects any of the Representations, and therefore it is possible to switch and view appropriate stream data depending on a communication environment and decode performance of the DASH client 70.

Figure 7:
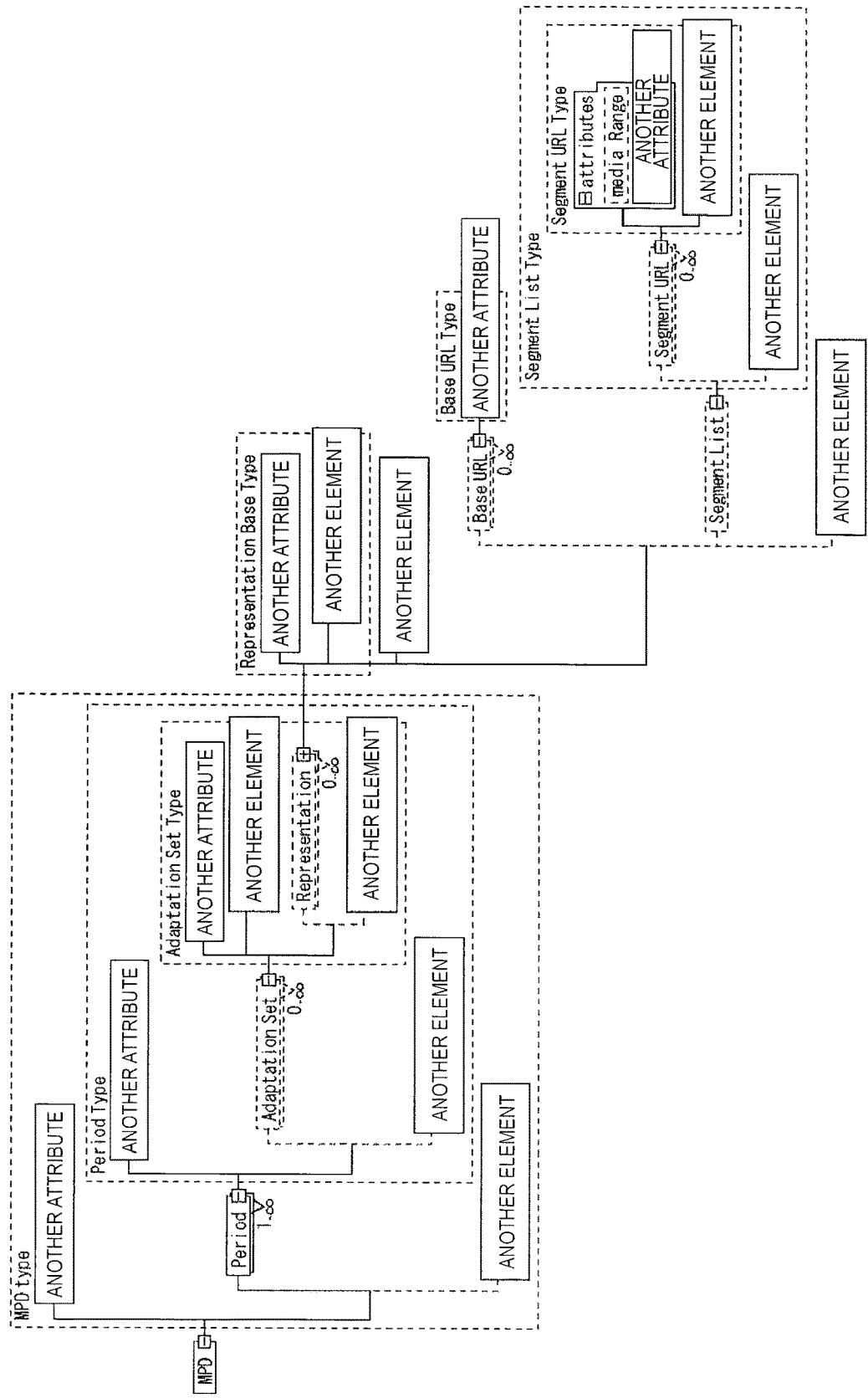
FIG. 7 is a diagram showing a detailed configuration lower than Representation of an MPD.

FIG. 7 shows a detailed configuration lower than Representation of the MPD. The Representation describes an address of the DASH segment streamer 62 that is the source of a file in which the segmented stream data is stored. Specifically, in a case in which each pieces of segmented stream data has been converted into a file individually, a sequence of an address (URL information) of each file is described. Alternatively, in a case in which pieces of segmented stream data has been converted into a file, a sequence of a range (mediaRange) of each of the segments of the file is described in addition to an address (Base URL) of the file. Note that, FIG. 7 shows the latter case.

FIG. 8 shows an example in which a configuration lower than Representation shown in FIG. 7 is described in an XML format.

In MPD/Period/AdaptationSet/Representation/BaseURL, an address of a source of a file is described in a case in which the segmented stream data has been converted into the file.

In FIG. 8, "http://example.com/counter-10mn_avc_dash.mp4" represents the address of the file.

In MPD/Period/AdaptationSet/Representation/SegmentList/SegmentURL/@mediaRange, a sequence of a byte range of the segmented stream data in the file is described.

Therefore, the DASH client 70 specifies "http://example.com/counter-10mn_avc_dash.mp4" as a URL of the file, specifies a mediaRange as its Range header, issues an HTTP request, and thereby acquires a desired segment.

For example, 'MPD/Period/AdaptationSet/Representation/SegmentList/SegmentURL/@mediaRange="795-83596"' indicates that a byte range from 795th byte to 83596th byte of the file is first segmented stream data. In a similar way, next 'MPD/Period/AdaptationSet/Representation/SegmentList/SegmentURL/@mediaRange="83597-166046"' indicates that a byte range from 83597th byte to 166046th byte is second segmented stream data.

Therefore, in order to acquire the first segment, it is necessary to specify a file URL "http://example.com/counter-10mn_avc_dash.mp4" and describe the mediaRange "795-83596" as a range specification. In this case, the HTTP request is as follows:
GET /counter-10mn_avc_dash.mp4 HTTP/1.1
Host: example.com
Range: bytes=795-83596

In a similar way, in order to acquire the second segment, it is necessary to issue the following HTTP request:
GET /counter-10mn_avc_dash.mp4 HTTP/1.1
Host: example.com
Range: bytes=83597-166046

[Rewrite of MPD]

According to the present embodiment, the segmented stream data is supplied to the DASH client 70 at the receiver side by using the unicast transmission via HTTP, the multicast transmission via RTP, and broadcast transmission via RTP. In addition, the seamless switching between the unicast transmission, the multicast transmission, and the broadcast transmission are performed in the DASH client 70.

In order to achieve the seamless switching, a ServiceLocation element is newly introduced. In addition, rtspRange representing a section of a stream segment to be multicasted or broadcasted via RTP is added, the stream segment corresponding to a byte range of a segment to be unicasted via HTTP.

FIG. 9 shows an example in which the MPD shown in FIG. 8 is rewritten. Specifically, an rtspRange attribute is placed in the SegmentURL element as an attribute for specifying a section of the segment stream to be multicasted and broadcasted via RTP that is to be switched from a segment to be transmitted via HTTP. In addition, a ServiceLocationAttributeUrl attribute is placed in BaseURL of the MPD, the ServiceLocationAttributeUrl attribute describing a URL of a ServiceLocationAttribute file in which a ServiceLocation element is stored as a root element.

The rtspRange attribute in the SegmentURL element of the rewritten MPD stores a string in a format (UTC format) of a range parameter for identifying an RTP stream section defined in the Real Time Streaming Protocol (RTSP) used for controlling an RTP streaming defined in Request For Comment (RFC) 2326. Note that, a format of information stored in the rtspRange attribute is not limited to the UTC format.

For example, in the case of FIG. 9, a first segment including a byte range from 795th byte to 83596th byte of a file to be unicasted via HTTP corresponds to a section from 19961108T143720.25Z to 19961108T143730.25Z of a segment stream to be multicasted or broadcasted via RTP.

In a similar way, a second segment including a byte range from 83597th byte to 166046th byte of a file to be unicasted via HTTP corresponds to a section from 19961108T143730.25Z to 19961108T143740.25Z of a segment stream to be multicasted or broadcasted via RTP.

FIG. 10 shows an example of an XML schema of a ServiceLocationAttribute file specified by the serviceLocationAttributeUrl attribute.

Figure 11:
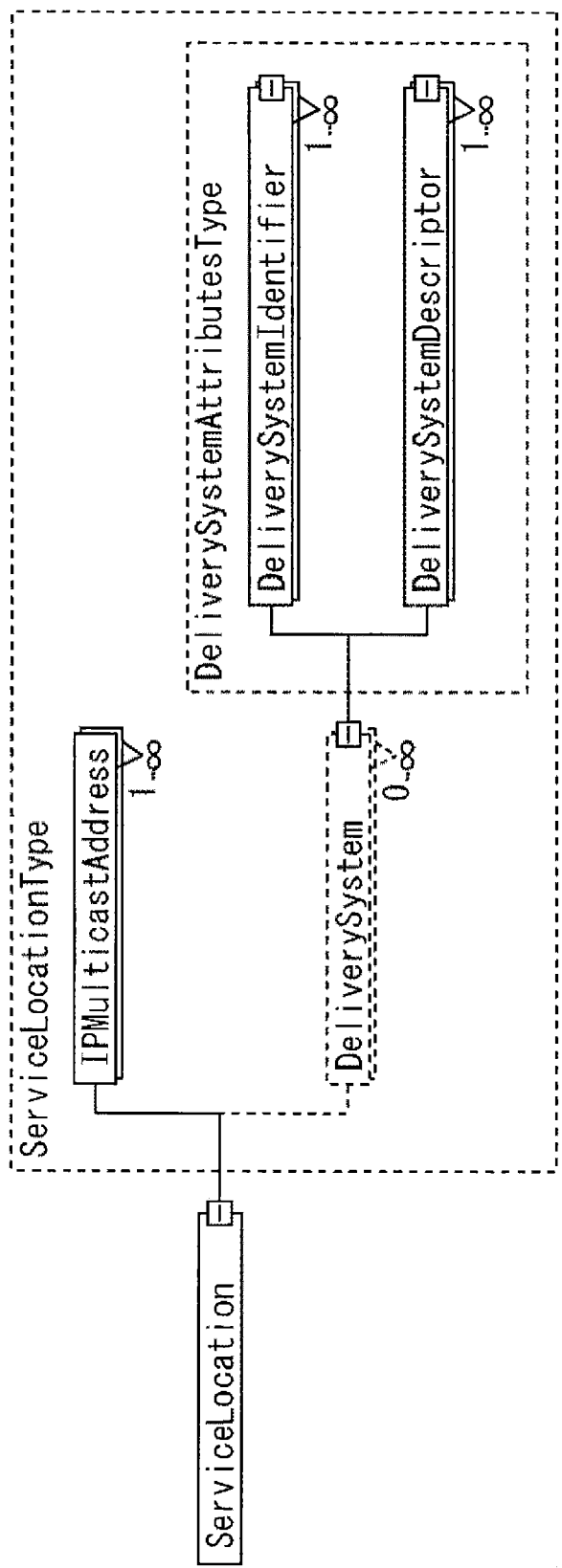
FIG. 11 is a diagram showing a data structure of a ServiceLocation element.

FIG. 11 shows a newly introduced ServiceLocation element. The ServiceLocation element includes a tuning parameter (DeliverySystemAttributes) and IPMulticastAddress. In addition, a URL of a ServiceLocationAttribute file in which the ServiceLocation element is stored as a root element is described in a ServiceLocationAttributeUrl attribute placed in a BaseURL.

For example, in a case in which the multicast bearer and the broadcast bearer of the mobile network such as the MBMS are used, a format identifier (ID_MBMS in a case of the MBMS) having a data structure of the tuning parameter used for the multicast transmission or the broadcast transmission based on the MBMS is described in DeliverySystemIdentifier of DeliverySystemAttributes.

Alternatively, in a case in which the broadcast bearer of the existing television network such as a DVB terrestrial network is used, a format identifier (ID_DVB_T in a case of the DVB terrestrial network) having a data structure of the tuning parameter used for the broadcast transmission in the DVB terrestrial network is described.

In the DeliverySystemDescriptor of the DeliverySystemAttributes, a data structure (parameter itself) of a tuning parameter defined in the broadcast delivery or the multicast delivery identified by the DeliverySystemIdentifier is described. Note that, actually, a byte sequence representing a parameter is converted into a string by Base64 or the like, and the string is described in the DeliverySystemDescriptor.

FIG. 12 is an example of the data structure of User Service Description as a tuning parameter used for the multicast transmission and the broadcast transmission according to the MBMS.

bundleDescription(namespase "urn:3GPP:metadata:2005:MBMS:userServiceDescription") is an element for bringing a plurality of userServiceDescription(namespace "urn:3GPP:metadata:2005:MBMS:userServiceDescription") together. The userServiceDescription is an element for storing information for acquiring (tuning/joining) a stream broadcasted or multicasted via MBMS, the stream being identified by a serviceId attribute.

deliveryMethod(namespase "urn:3GPP:metadata:2005:MBMS:userServiceDescription") is an element for specifying Session Description Protocol (SDP) in which a multicast addresss of a stream is described. Specifically, a URL of an SDP file is specified by a sessionDescriptionURI attribute. Registration(namespace "urn:3GPP:metadata:2008:MBMS:userServiceDescription") is, for example, a process (linked to an authentication session to be performed by running a server side script specified by a registrationURL attribute (in a case in which the multicast stream is encoded/protected)) for acquiring a protection key or the like of a stream that is necessary to register in a multicast service.

In a case in which the above described UserServiceDescription structure is stored in the DeliveryServiceDescriptor, a MBMS broadcast stream or a MBMS multicast stream can be acquired by registering in accordance with a process defined in provisions of a MBMS service.

Figure 13A:
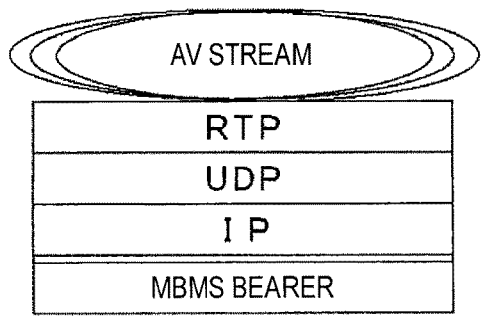
FIGS. 13A, 13B are diagrams showing hierarchy of a protocol.

As described above, on the MBMS broadcast stream or the MBMS multicast stream acquired in accordance with information stored in the ServiceLocation/DeliverySystem elements, a content stream is delivered via RTP to an IP packet stream having a multicast address specified by the ServiceLocation/IPMulticastAddress elements among IP packet streams. In this case, hierarchy of the protocol is as shown in FIG. 13A.

In a case in which the broadcast bearer based on the DVB terrestrial network is used, a DVBurl format dvb://<ONid>.<TSid>.<Sid> including VB Triplet defined in "ETSI TS 102 851 V1.1.1 (2010-01) Digital Video Broadcasting (DVB); Uniform Resource Identifiers (URI) for DVB Systems" is stored as a tuning parameter, and a broadcast stream based on the DVB terrestrial network is acquired by referring to the DVBurl format.

Here, the DVB_Triplet indicates information on three items including an original network identifier ONid stored in a network information table NIT of DVB-SI, and a transport stream identifier TSid and a service identifier Sid that are stored in a stream description table SDT of the DVB-SI.

Figure 13B:
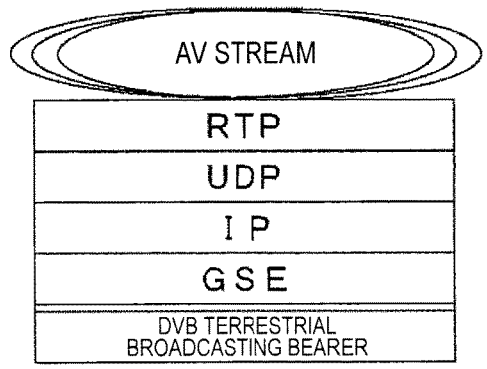

As described above, a content stream is delivered via the RTP protocol to an IP packet stream having a multicast address specified by the ServiceLocation/IPMulticastAddress elements among IP packet streams to be forwarded on the broadcast stream based on the DVB terrestrial network acquired by the DVBurl format stored in the ServiceLocation/DeliverySystem elements. In this case, hierarchy of the protocol is as shown in FIG. 13B.

[Operation of Content Supplying System 50]

Next, an operation of the content supplying system 50 is explained.

Figure 14:
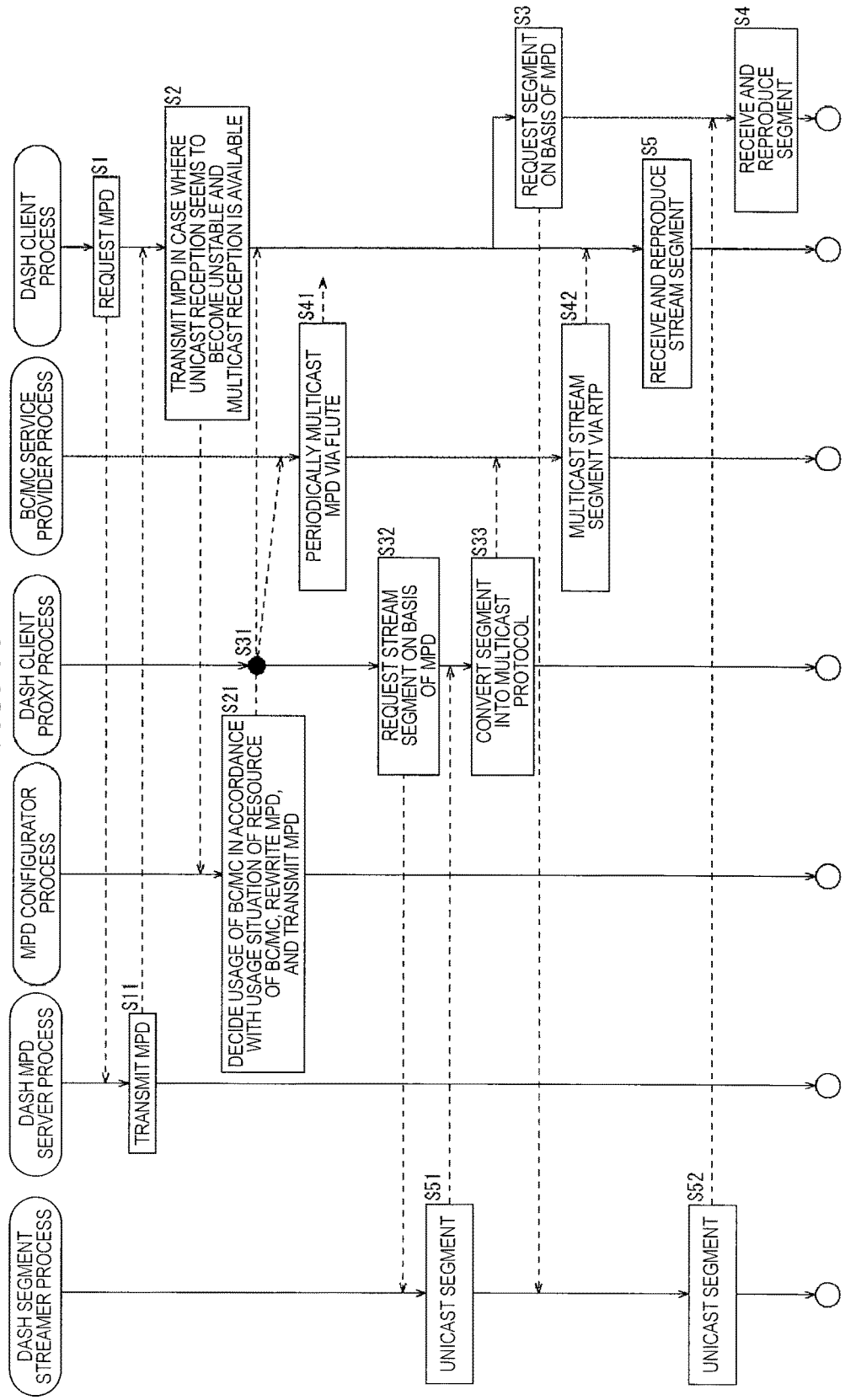
FIG. 14 is a flowchart showing a first operation of a content supplying system.

FIG. 14 is a flowchart illustrating a first operation of the content supplying system 50. In the first operation, the DASH client 70 spontaneously requests the MPD configurator 65 to rewrite an MPD.

Note that, as a premise of the first operation, the DASH segment streamer 62 has acquired pieces of streaming data having different bit rates for content having identical contents from the content management server 61, segmented each of the pieces of the streaming data, retained the segmented data, and started transmitting the segmented data via HTTP.

In addition, the DASH MPD server 63 has generated an MPD on the basis of an address of a file of the stream segment notified by the DASH segment streamer 62, and started transmitting the MPD via HTTP.

In Step S1, the DASH client 70 accesses the DASH MPD server 63 via the Internet 11 and request the DASH MPD server 63 to transmit the MPD via HTTP so as to receive and reproduce content. Note that, the DASH client 70 already knows an address of the DASH MPD server 63.

In Step S11, the DASH MPD server 63 transmits the MPD to the DASH client 70 via HTTP through the Internet 11 in response to the request from the DASH client 70.

The DASH client 70 that has received the MPD accesses the DASH segment streamer 62 on the basis of the MPD, and receives and reproduces a stream segment unicasted via HTTP. Specifically, an HTTP request is issued on the basis of BaseURL and mediaRange of the MPD, and the DASH segment streamer 62 is requested to transmit a file of a DASH stream segment via HTTP. In response to the request, the DASH segment streamer 62 transmits the corresponding file to the DASH client 70 via HTTP though the Internet 11, and the DASH client 70 receives and reproduces the corresponding file.

In Step S2, the DASH client 70 monitors bands of the Internet 11 while receiving, and transmits the acquired MPD to the MPD configurator 65 and request the MPD configurator 65 to rewrite the MPD in a case in which the unicast reception seems to become unstable hereinafter and the DASH client 70 itself can receive the content multicasted or broadcasted through the network 12.

In Step S21, the MPD configurator 65 checks with the broadcast/multicast resource manager 66 regarding a usage situation of the resource of the broadcast bearer and the multicast bearer in response to the request to rewrite the MPD from the DASH client 70. In addition, the usage is decided in view of cost for using the broadcast bearer and the multicast bearer together, and the broadcast/multicast resource manager 66 is requested to reserve the resource. After receiving a notification that the resource has been reserved from the broadcast/multicast resource manager 66, the MPD configurator 65 rewrites the MPD and transmits the rewritten MPD to the DASH client 70. Note that, the rewritten MPD that has been transmitted is monitored by the DASH client proxy 67 before the DASH client 70 receives the MPD.

In Step S31, the DASH client proxy 67 that has monitored the rewritten MPD requests the broadcast/multicast provider 68 to periodically multicast the MPD via FLUTE through the network 12. In Step S41, the broadcast/multicast provider 68 periodically multicasts the rewritten MPD via FLUTE through the network 12 in response to the request. By such multicast transmission, the rewritten MPD can be supplied also to a DASH client 70 that has not issued the request to rewrite the MPD.

In Step S32, the DASH client proxy 67 requests the DASH segment streamer 62 to provide a stream segment instead of the DASH client 70 on the basis of the monitored MPD. In Step S51, the DASH segment streamer 62 unicasts the stream segment to the DASH client proxy 67 via HTTP through the Internet 11 in response to the request.

In Step S33, the DASH client proxy 67 that has received the stream segment unicasted via HTTP performs protocol conversion for migrating, to payload of an RTP packet, the stream segment stored in an HTTP packet. In addition, the DASH client proxy 67 requests the broadcast/multicast provider 68 to multicast and broadcast the stream segment after the protocol conversion via RTP through the network 12.

In Step S42, the broadcast/multicast provider 68 starts to multicast and broadcast the stream segment after the protocol conversion via RTP through the network 12 in response to the request.

Note that, the DASH client 70 that has acquired the rewritten MPD proceeds to Step S3 or Step S5 subsequently.

That is, the DASH client 70 proceeds to Step S4 in a case in which reception and reproduction of the stream segment unicasted via HTTP through the Internet 11 is continued. The DASH client 70 proceeds to Step S5 in a case in which the stream segment is switched to a stream segment multicasted or broadcasted via RTP through the network 12.

In Step S3, the DASH client 70 requests the DASH segment streamer 62 to provide the stream segment on the basis of the MPD in the case in which the reception and reproduction of the unicasted stream segment are continued. Subsequently, in Step S4, the DASH client 70 receives and reproduces the stream segment unicasted from the DASH segment streamer 62 via HTTP through the Internet 11 (process in Step S52) in response to the request.

In Step S5, on the basis of the rewritten MPD, the DASH client 70 switches reception and reproduction from reception and reproduction of the segment stream unicasted via HTTP to reception and reproduction of the multicasted or broadcasted stream segment after the protocol conversion in a case of switching to the stream segment multicasted or broadcasted via RTP through the network 12.

By relying on time section information of rtspRange stored in a Segment sequence corresponding to Representation corresponding to a multicast stream on the rewritten MPD, timing of the switching is decided on the basis of a correspondence relation with the Segment sequence corresponding to Representation to be unicasted.

Note that, the above described method for storing a stream segment in payload of an RTP packet in the protocol conversion is set for each content encoding scheme (AVC, AMR, or the like). In a case of streaming via RTP, an RTP timestamp and a corresponding Network Time Protocol (NTP) timestamp are forwarded for deciding a time axis of synchronous reproduction between streams transmitted by a plurality of RTP packet streams while using the RTP Control Protocol (RTCP) at the same time.

Note that, the NTP timestamp represents seconds since Jan. 1, 1970, 00:00 (an unsigned fixed point having 32 bits of an integer part and 32 bits of a fraction part), and the NTP timestamp can be easily converted into a UTC timestamp (a format example is: 2004-04-01T12:00Z (20040401T1200Z) that represents noon of Apr. 1, 2004 in UTC). Accordingly, a position (time) on absolute time (wall clock time) of the RTP timestamp can be calculated. That is, system time (wall clocks) of a content supplier and the content receiver are synchronized by the NTP timestamp, and an RTP packet to be switched is specified on the time axis on the basis of information on a correspondence relation between the RTP timestamp and the NTP timestamp transmitted via RTCP.

After that, the seamless switching can be performed between the stream segment to be unicasted via HTTP through the Internet 11, and the stream segment to be multicasted or broadcasted via RTP through the network 12.

The first operation of the content supplying system 50 has been explained.

Next, FIG. 15 is a flowchart illustrating a second operation of the content supplying system 50. In the second operation, the MPD proxy server 64 takes the initiative in requesting the MPD configurator 65 to rewrite an MPD.

Note that, as a premise of the second operation, the DASH segment streamer 62 has acquired pieces of streaming data having different bit rates for content having identical contents from the content management server 61, segmented each of the pieces of the streaming data, retained the segmented data, and started transmitting the segmented data via HTTP.

In addition, the DASH MPD server 63 has generated an MPD on the basis of an address of a file of the stream segment notified by the DASH segment streamer 62, and started transmitting the MPD via HTTP.

In Step S71, the DASH client 70 requests the DASH MPD server 63 to transmit MPD via HTTP through the Internet 11 so as to receive and reproduce content. The MPD proxy server 64 receives the request, and the MPD proxy server 64 requests the DASH MPD server 23 to transmit the MPD in Step S81.

In Step S91, the DASH MPD server 63 transmits the MPD to the MPD proxy server 64 in response to the request. In Step S82, the MPD proxy server 64 that has received the MPD transmits the received MPD to the MPD configurator 65 and requests the MPD configurator 65 to rewrite the MPD.

In Step S101, the MPD configurator 65 checks with the broadcast/multicast resource manager 66 regarding a usage situation of the resource of the broadcast bearer and the multicast bearer in response to the request to rewrite the MPD. In addition, the usage is decided in view of cost for using the broadcast bearer and the multicast bearer together, and the broadcast/multicast resource manager 66 is requested to reserve the resource. After receiving a notification that the resource has been reserved from the broadcast/multicast resource manager 66, the MPD configurator 65 rewrites the MPD and transmits the rewritten MPD to the MPD proxy server 64.

In Step S83, the MPD proxy server 64 transmits the rewritten MPD to the DASH client 70. Note that, the rewritten MPD that has been transmitted is monitored by the DASH client proxy 67 before the DASH client 70 receives the MPD.

In Step S111, the DASH client proxy 67 that has monitored the rewritten MPD requests the broadcast/multicast provider 68 to periodically multicast the MPD via FLUTE through the network 12. In Step S121, the broadcast/multicast provider 68 periodically multicasts the rewritten MPD via FLUTE through the network 12 in response to the request. By such multicast transmission, the rewritten MPD can be supplied also to a DASH client 70 that has not issued the request to transmit the MPD.

In Step S113, the DASH client proxy 67 requests the DASH segment streamer 62 to provide a stream segment instead of the DASH client 70 on the basis of the monitored and rewritten MPD. In Step S131, the DASH segment streamer 62 unicasts the stream segment to the DASH client proxy 67 via HTTP through the Internet 11 in response to the request.

In Step S113, the DASH client proxy 67 that has received the stream segment unicasted via HTTP performs protocol conversion for migrating, to payload of an RTP packet, the stream segment stored in an HTTP packet. In addition, the DASH client proxy 67 requests the broadcast/multicast provider 68 to multicast and broadcast the stream segment after the protocol conversion via RTP through the network 12.

In Step S122, the broadcast/multicast provider 68 starts to multicast and broadcast the stream segment after the protocol conversion via RTP through the network 12 in response to the request.

On the other hand, the DASH client 70 has already acquired the rewritten MPD. In Step S72, the DASH client 70 selects whether to receive unicast transmission through the Internet 11 or to receive multicast transmission or broadcast transmission through the network 12, on the basis of a band status of the Internet 11, a reception function of the DASH client 70, and the like.

In a case in which reception and reproduction of a stream segment unicasted via HTTP through the Internet 11 is selected, the process proceeds to Step S73. In Step S73, the DASH client 70 requests the DASH segment streamer 62 to provide the stream segment on the basis of the MPD. Subsequently, in Step S74, the DASH client 70 receives and reproduces the stream segment unicasted from the DASH segment streamer 62 via HTTP through the Internet 11 (process in Step S132) in response to the request.

In a case in which reception and reproduction of a stream segment multicasted or broadcasted via RTP through the network 12 is selected, the process proceeds to Step S75. In Step S75, on the basis of the rewritten MPD, the DASH client 70 receives and reproduces a stream segment after protocol conversion that has been multicasted or broadcasted via RTP.

After that, the seamless switching can be performed between the stream segment to be unicasted via HTTP through the Internet 11, and the stream segment to be multicasted or broadcasted via RTP through the network 12.

The second operation of the content supplying system 50 has been explained.

As explained above, in the content supplying system 50 according to the embodiments of the present disclosure, seamless switching can be performed between the stream segment to be unicasted via HTTP through the Internet 11, and the stream segment to be multicasted or broadcasted via RTP through the network 12. Therefore, a user of the DASH client 70 can adaptively select and view streams having an identical content and having different paths.

The content supplying system 60 and the DASH client 70, which perform the series of processes described above, can be realized by a computer executing software, as well as being respectively configured by hardware. Here, the expression "computer" includes a computer in which dedicated hardware is incorporated and a general-purpose personal computer or the like that is capable of executing various functions when various programs are installed.

FIG. 16 is a block diagram showing a hardware configuration example of the computer.

In the computer 100, a central processing unit (CPU) 101, read only memory (ROM) 102, and random access memory (RAM) 103 are mutually connected by a bus 104.

An input/output interface 105 is also connected to the bus 104. An input unit 106, an output unit 107, a storage unit 108, a communication unit 109, and a drive 110 are connected to the input/output interface 105.

The input unit 106 is configured from a keyboard, a mouse, a microphone or the like. The output unit 107 is configured from a display, a speaker or the like. The storage unit 108 is configured from a hard disk, a non-volatile memory or the like. The communication unit 109 is configured from a network interface or the like. The drive 110 drives a removable medium 111 such as a magnetic disk, an optical disk, a magneto-optical disk, a semiconductor memory or the like.

In the computer 100 configured as described above, the CPU 101 loads a program that is stored, for example, in the storage unit 108 onto the RAM 103 via the input/output interface 105 and the bus 104, and executes the program. Thus, the above-described series of processes are performed.

Programs to be executed by the computer 100 (CPU 101) are provided being recorded in the removable medium 111 which is a packaged medium or the like. Also, programs may be provided via a wired or wireless transmission medium, such as a local area network, the Internet or digital satellite broadcasting.

In the computer 100, by inserting the removable medium 111 into the drive 110, the program can be installed in the storage unit 108 via the input/output interface 105. Further, the program can be received by the communication unit 109 via a wired or wireless transmission medium and installed in the storage unit 108. Moreover, the program can be installed in advance in the ROM 102 or the storage unit 108.

Note that the program executed by the computer 100 may be a program in which processes are carried out in a time series in the order described in this specification or may be a program in which processes are carried out in parallel or at necessary timing, such as when the processes are called.

An embodiment of the disclosure is not limited to the embodiments described above, and various changes and modifications may be made without departing from the scope of the disclosure.

REFERENCE SIGNS LIST

11 Internet
12 network
50 content supplying system
60 content supplying device
61 content management server
62 DASH segment streamer
63 DASH MPD server
64 MPD proxy server
64 MPD configurator
65 broadcast/multicast resource manager
66 DASH client proxy
67 broadcast/multicast service provider
70 DASH client
100 computer
101 CPU

The invention claimed is:

1. A content supplying device, comprising:
circuitry configured to:
convert streaming data into segment files;
unicast a first portion of the segment files according to a first protocol in response to a request to transmit the streaming data to a receiver by unicasting;
multicast or broadcast one or more segment streams corresponding to a second portion of the segment files according to a second protocol different from the first protocol in response to a request to transmit the streaming data to the receiver by multicasting or broadcasting;
generate a metafile describing a chronological correspondence relation between the second portion of the segment files and the one or more segment streams;
transmit the metafile to the receiver; and
transmit timestamp information according to a control protocol associated with the second protocol.

2. The content supplying device according to claim 1, wherein the circuitry is further configured to:
generate a media presentation description (MPD) describing information corresponding to the segment files to be unicasted according to the first protocol; and
generate the metafile by rewriting the MPD.

3. The content supplying device according to claim 2, wherein the circuitry is configured to:
generate the metafile by adding section information of the one or more segment streams to be multicasted or broadcasted in association with byte information of the second portion of the segment files to be unicasted, the byte information being described in the MPD.

4. The content supplying device according to claim 2, wherein the circuitry is configured to:
perform protocol conversion to convert the second portion of the segment files for unicasting according to the first protocol into the one or more segment streams for multicasting or broadcasting according to the second protocol.

5. The content supplying device according to claim 1, wherein
the first protocol is a Hypertext Transfer Protocol (HTTP), and
the second protocol is a Real-time Transport Protocol (RTP).

6. A content supplying method performed by a content supplying device, the content supplying method comprising:
converting streaming data into segment files;

unicasting a first portion of the segment files according to a first protocol in response to a request to transmit the streaming data to a receiver by unicasting;

multicasting or broadcasting one or more segment streams corresponding to a second portion of the segment files according to a second protocol different from the first protocol in response to a request to transmit the streaming data to the receiver by multicasting or broadcasting;

generating, by circuitry of the content supplying device, a metafile describing a chronological correspondence relation between the second portion of the segment files and the one or more segment streams;

transmitting the metafile to the receiver; and transmitting timestamp information according to a control protocol associated with the second protocol.

7. The content supplying method according to claim 6, wherein the first protocol is a Hypertext Transfer Protocol (HTTP), and the second protocol is a Real-time Transport Protocol (RTP).

8. A content supplying system comprising:

a content supplying device that supplies streaming data; and a client device that receives the stream data, wherein the content supplying device comprises circuitry configured to:

convert the streaming data into segment files;

unicast a first portion of the segment files according to a first protocol in response to a request to transmit the streaming data to the client device by unicasting;

multicast or broadcast one or more segment streams corresponding to a second portion of the segment files according to a second protocol different from the first protocol in response to a request to transmit the streaming data to the client device by multicasting or broadcasting;

generate a metafile describing a chronological correspondence relation between the second portion of the segment files and the one or more segment streams;

transmit the metafile to client device; and transmit timestamp information according to a control protocol associated with the second protocol, and wherein the client device is configured to reproduce the streaming data based on the first portion of the segment files, the one or more segment streams, and the metafile.

9. A non-transitory computer-readable medium storing computer-readable instructions thereon, the computer-readable instructions when executed by a content supplying device cause the content supplying device to perform a method comprising:

converting streaming data into segment files;

unicasting a first portion of the segment files according to a first protocol in response to a request to transmit the streaming data to a receiver by unicasting;

multicasting or broadcasting one or more segment streams corresponding to a second portion of the segment files according to a second protocol different from the first protocol in response to a request to transmit the streaming data to the receiver by multicasting or broadcasting;

generating, by circuitry of the content supplying device, a metafile describing a chronological correspondence relation between the second portion of the segment files and the one or more segment streams;

transmitting the metafile to the receiver; and transmitting timestamp information according to a control protocol associated with the second protocol.

10. A content receiving device configured to receive stream data that has been converted into segment files, the content receiving device comprising:

circuitry configured to:

receive a first portion of the segment files that is unicasted according to a first protocol;

receive one or more segment streams corresponding to a second portion of the segment files that are multicasted or broadcasted according to a second protocol;

receive a metafile describing a chronological correspondence relation between the second portion of the segment files and the one or more segment streams;

receive timestamp information according to a control protocol associated with the second protocol; and reproduce the streaming data based on the first portion of the segment files, the one or more segment streams, and the metafile.

11. The content receiving device according to claim 10, wherein the metafile includes section information of the one or more segment streams in association with byte information of the second portion of the segment files.

12. The content receiving device according to claim 10, wherein the stream data correspond to a television content, and the circuitry is configured to receive the first portion of the segment files or the one or more segment streams from a television network.

13. The content receiving device according to claim 10, wherein the first protocol is a Hypertext Transfer Protocol (HTTP), and the second protocol is a Real-time Transport Protocol (RTP).

14. A content receiving method performed by a content receiving device configured to receive stream data that has been converted into segment files, the content receiving method comprising:

receiving a first portion of the segment files that is unicasted according to a first protocol;

receiving one or more segment streams corresponding to a second portion of the segment files that are multicasted or broadcasted according to a second protocol;

receiving a metafile describing a chronological correspondence relation between the second portion of the segment files and the one or more segment streams;

receiving timestamp information according to a control protocol associated with the second protocol; and reproducing, by circuitry of the content receiving device, the streaming data based on the first portion of the segment files, the one or more segment streams, and the metafile.

15. The content receiving method according to claim 14, wherein the metafile includes section information of the one or more segment streams in association with byte information of the second portion of the segment files.

16. The content receiving method according to claim 14, wherein the first protocol is a Hypertext Transfer Protocol (HTTP), and the second protocol is a Real-time Transport Protocol (RTP).

17. A non-transitory computer-readable medium storing computer-readable instructions thereon, the computer-readable instructions when executed by a content receiving device cause the content receiving device to perform a method of receiving stream data that has been converted into segment files, the method comprising:
- receiving a first portion of the segment files that is unicasted according to a first protocol;
- receiving one or more segment streams corresponding to a second portion of the segment files that are multicasted or broadcasted according to a second protocol;
- receiving a metafile describing a chronological correspondence relation between the second portion of the segment files and the one or more segment streams;
- receiving timestamp information according to a control protocol associated with the second protocol; and
- reproducing the streaming data based on the first portion of the segment files, the one or more segment streams, and the metafile.

* * * * *